United States Patent [19]
Moon

[11] Patent Number: 6,083,999
[45] Date of Patent: Jul. 4, 2000

[54] PROCESS FOR THE PREPARATION OF A SUPER LIGHTWEIGHT FOAMED SHEET

[75] Inventor: Hyung Seob Moon, Seoul, Rep. of Korea

[73] Assignee: Elio Davide Cattan, Milan, Italy

[21] Appl. No.: 09/016,998

[22] Filed: Feb. 2, 1998

[30] Foreign Application Priority Data

Jul. 30, 1997 [KR] Rep. of Korea ............ 97-35969

[51] Int. Cl.$^7$ ........................................... C08J 9/00
[52] U.S. Cl. ........................ 521/50; 521/142; 521/143
[58] Field of Search .................................. 521/142, 143, 521/94, 89, 92, 93

[56] References Cited

U.S. PATENT DOCUMENTS

| | | | |
|---|---|---|---|
| 4,330,495 | 5/1982 | Halle et al. | 521/143 |
| 4,360,556 | 11/1982 | Heider | 521/143 |

FOREIGN PATENT DOCUMENTS

| | | |
|---|---|---|
| 0 327 742 | 8/1989 | European Pat. Off. . |
| 0 432 096 | 6/1991 | European Pat. Off. . |

*Primary Examiner*—Morton Foelak
*Attorney, Agent, or Firm*—Lorusso & Loud

[57] ABSTRACT

A process for preparing super lightweight sheet of the present invention comprises the steps of mixing a low density polyethylene (LDPE), a first blowing agent, a surface activation agent and a separation agent; heating the obtained mixture at a temperature higher than 160° C. to obtain a molten mass; heating said molten mass at a temperature higher than the gasification temperature of said first blowing agent to separate said first blowing agent; cooling the obtained mixture; and forming the cooled mass in a sheet.

In a preferred embodiment, the process of the present invention process further comprises the steps of introducing a second gaseous blowing agent in the cooled mass to obtain a foamed mass; maintaining the foamed mass at a stabilizing temperature to stabilize the foamed mass; and cooling the foamed mass at 20–25° C. and maintaining the cooled mass at said temperature for 24 hours.

17 Claims, No Drawings

PROCESS FOR THE PREPARATION OF A SUPER LIGHTWEIGHT FOAMED SHEET

The present invention is related to a process for preparing a super lightweight expanded and foamed sheet required as lining for garments having excellent buoyancy, thermal resistance and moisture resistance properties.

BACKGROUND OF THE INVENTION

Articles including a laminated foamed material for thermal insulation for constructions and for laggings for home appliances and vehicles are already known. It is also known to provide garments with foamed materials for thermal insulation.

For example, U.S. Pat. No. 2,976,539 discloses a thermally-insulating garment having a lining made of an expanded, closed-cell, cellular material, preferably polyvinyl chloride. However, this garment is thick and cumbersome and does not present sufficient buoyancy to support a person's weight in water.

Furthermore, U.S. Pat. No. 3,511,743 discloses a thermal insulating laminate for space and diving suits having a core made of an open- or closed-cell foamed material and a fluid impermeable rubber or plastic skin. This laminate gives moderate mobility, but is still enough cumbersome and has not sufficient buoyancy properties to serve as a life-saver device.

Moreover, polyethylene foams have been suggested as insulation or filters for life rafts and jackets. For example, U.S. Pat. No. 3,067,147 suggests the use for such a purpose of a low density polyethylene foam which is processed with 1,2-dichlorotetrafluoroethene as foaming or blowing agent. The polyethylene and the blowing agent are heated under pressure and extruded into the atmosphere to form an expanded cellular mass. However, the obtained product is bulky and cumbersome in the practical use.

BRIEF DESCRIPTION OF THE INVENTION

It is an object of the present invention to eliminate the above mentioned drawbacks by providing a foamed expanded super lightweight sheet having superior buoyancy and cold and heat resistance properties.

Another object of the present invention is to provide a process for the preparation of a super lightweight foamed sheet having superior buoyancy and cold and heat resistance properties.

Yet another object of the invention is to provide a thin and super lightweight lining for garments and sports articles and other related equipment which are cumbersome and bulky, while yet combining both buoyancy and thermal resistance properties.

These objects and other aims that will become evident from the following description of the present invention are achieved by a process for preparing the super lightweight sheet of the present invention comprises the steps of:

(i)—mixing a low density polyethylene (LDPE), a first blowing agent, a surface activation agent and a separation agent;

(ii)—heating the obtained mixture at a temperature higher than 160° C. to obtain a molten mass;

(iii)—heating said molten mass at a temperature higher than the gasification temperature of said first blowing agent;

(iv)—cooling the obtained mixture; and (v)—forming the cooled mass in a sheet.

Preferably, the mixture low density polyethylene (LDPE), first blowing agent, surface activation agent and separation agent is heated in the stage (iii) of the invention process at a temperature in the range of about 205–210° C.

Moreover, in the process of the present invention the mixture is preferably cooled in step (iv) up to 140° C. and maintained at this temperature to stabilize the formed foam.

In a preferred embodiment, the process of the present invention process further comprises, after step (iv) and before step (v), the following steps:

introducing a second gaseous blowing agent in the cooled mass to obtain a foamed mass;

maintaining the foamed mass at a stabilizing temperature to stabilize the foamed mass; and cooling the foamed mass at 20–25° C. and maintaining the cooled mass at said temperature for 24 hours.

Preferably, said second gaseous blowing agent is introduced at a pressure of 40 kg/cm$^2$. Said stabilizing temperature is preferably of 100° C.

DETAILED DESCRIPTION OF THE INVENTION

The LDPE used is well-known in the art as a multipurpose thermal plasticity resin having sufficient elasticity and softness as a foam, and is characterized by a density ratio of 0.92.

The first blowing agent used in the process of the present invention is preferably selected among azodicarbon-amide (commercially available as Cellogen-AZ), N,N'-dinitroso-pentamethyl-tetramine (DPT) (commercially available as Vulcacel BN94) and TP-oxybis-benzene-sulphonyl-hydrazide (commercially-available as Cellogen-OT). The gasifying temperature of such blowing agents is about 190° C. Accordingly, the mixture of low density polyethylene (LDPE), first blowing agent, surface activation agent and separation agent is heated in the stage (ii) of the invention process at a temperature higher than 190° C.

The first blowing agent is preferably added in an amount of about 1% by weight referred to the polyethylene.

Suitable surface activation agents include, for example, zinc oxide, natrium oxide and potassium carbonate.

The surface activation agent is preferably added in an amount of about 0.1–0.2% by weight referred to the polyethylene A separation agent suitable for use in the invention process is, for example, ZnC which aids in preventing the LDPE form sticking to the internal parts of the apparatus used to carry out the process.

The separation agent is preferably added in an amount of about 0.3% by weight referred to the polyethylene.

Examples of second gaseous blowing agents suitable for use in the invention process are: barium-zinc organic complexes, calcium-zinc organic complexes and natrium-potassium-ZnC organic complexes.

The second gaseous blowing agent is preferably added in an amount of about 1% by weight referred to the polyethylene.

To carry out the process of the present invention, the low density polyethylene (LDPE), the first blowing agent, the surface activation agent and the separation agent are mixed in a mixing device, for example, in a hopper.

The obtained mixture is then fed in a heating device.

In a preferred embodiment, this mixture is fed in a heating tunnel comprising a first portion wherein the mixture is heated at 160° C. to obtain a molten mass.

The molten mass thus obtained travels to a second portion of the heating tunnel wherein said mass is maintained at a temperature higher than the gasifying temperature of the first blowing agent, preferably about 205–210° C., and a gasifying mixture is obtained.

Then, the gasifying mixture travels to a cooling portion of the tunnel.

For increasing the blowing ratio of the LDPE, in a preferred embodiment, the second gaseous blowing agent, as azodicarbon-amide, is introduced at a pressure of 40 kg/cm$^2$. After the introduction of the gaseous blowing agent and additional expansion of the polyethylene mass, such mass is maintained in the heating tunnel at 100° C.

The mass is then cooled and subjected to a temperature ranging from 20 to 25° C. for 24 hours thereby the cells harden and shrink slightly.

Subsequently, the obtained material may be cut with a cutting blade in sheets.

The foamed and expanded low density polyethylene of the present invention finds a multitude of uses as linings for garments, sleeping bags, blankets, cushions, sportswear and other related articles.

The material obtained with the process of the present invention can be used to obtain linings and garments which retain their buoyancy and flotation ability even when ripped or torn.

It will be appreciated that while the invention has been described with reference to specific and preferred embodiments thereof, no limitation to such embodiments was intended, the scope of the present invention being defined by the appended claims.

What is claimed is:

1. Process for preparing a super lightweight foamed sheet comprising the steps of:
    (i)—mixing a low density polyethylene (LDPE), a first blowing agent, a surface activation agent and a separation agent;
    (ii)—heating the obtained mixture at a temperature higher than 160° C. to obtain a molten mass;
    (iii)—heating said molten mass at a temperature higher than the gasification temperature of said first blowing agent;
    (iv)—cooling the obtained mixture introducing a second gaseous blowing agent into the cooled mass, thereafter heating to obtain a foamed product and subsequently cooling said foamed product; and
    (v)—forming the cooled mass in a sheet.

2. Process according to claim 1 further comprising, after step (iv), the step of:
    maintaining said foamed mass at a stabilizing temperature to stabilize said foamed mass and before cooling the foamed mass.

3. Process according to claim 1, wherein in step (iii) said molten mass is heated at a temperature higher than 190° C., preferably about 205–210° C.

4. Process according to claim 1, wherein in step (iv) said first cooled mixture is cooled up to 140° C. and maintained at this temperature to stabilize the formed foam.

5. Process according to claim 1, wherein said second blowing agent is introduced at a pressure of 40 kg/cm$^2$.

6. Process according to claim 2, wherein said stabilizing temperature is 100° C.

7. Process according to claim 1, wherein said foamed mass is cooled at 20–25° C. and maintained at this temperature for 24 hours.

8. Process according to claim 1, wherein said first blowing agent is selected from the group consisting in azodicarbon-amide, N,N'-dinitroso-pentamethyl-tetramine (DPT) and TP-oxybis-benzene-sulphonyl-hydrazide.

9. Process according to claim 1, wherein said first blowing agent is used in an amount of 1% by weight referred to the weight of polyethylene.

10. Process according to claim 1, wherein said surface activation agent is selected from the group consisting in zinc oxide, natrium oxide and potassium carbonate.

11. Process according to claim 1, wherein said surface activation agent is used in an amount of 0.1–0.2% by weight referred to the weight of polyethylene.

12. Process according to claim 1, wherein said separation agent is ZnC.

13. Process according to claim 1, wherein said separation agent is used in an amount of 0.3% by weight referred to the weight of polyethylene.

14. Process according to claim 1, wherein said second blowing agent is selected from the group consisting in barium-zinc organic complexes, calcium-zinc organic complexes and natrium-potassium-ZnC organic complexes.

15. Process according to claim 1, wherein said second blowing agent is used in an amount of 1% by weight referred to the weight of polyethylene.

16. Super lightweight foamed sheet obtained by a process according to claim 1.

17. Garment comprising a sheet obtained by the process according to claim 1.

* * * * *